United States Patent

Stampa

[15] 3,684,761
[45] Aug. 15, 1972

[54] ANIONIC DISPERSION POLYMERIZATION OF STYRENE MONOMERS

[72] Inventor: Guido B. Stampa, Watchung, N.J.
[73] Assignee: Union Carbide Corporation
[22] Filed: Aug. 30, 1968
[21] Appl. No.: 756,372

[52] U.S. Cl.............260/33.2 R, 260/33.6, 260/34.2, 260/93.5 S
[51] Int. Cl...........................C08f 7/04, C08f 45/34
[58] Field of Search...260/93.5 S, 93.5 W, 880, 33.2, 260/33.6, 34.2

[56] References Cited

UNITED STATES PATENTS

| | | | |
|---|---|---|---|
| 2,956,991 | 10/1960 | Coover et al. | 260/93.7 |
| 2,969,346 | 1/1961 | Coover et al. | 260/93.7 |
| 3,169,948 | 2/1965 | Hardy | 260/88.2 |

FOREIGN PATENTS OR APPLICATIONS 1,008,183  10/1965  Great Britain.............260/880

Primary Examiner—Morris Liebman
Assistant Examiner—Richard Zaitlen
Attorney—Paul Rose and Louis C. Smith, Jr.

[57] ABSTRACT

High molecular weight polymers are produced by the anionic dispersion polymerization of styrene monomers, particularly α-methylstyrene. The polymerization is carried out at a temperature below the ceiling temperature of the resulting polymer and in the presence of a diluent and a dispersing agent such as poly(vinyl alkyl ether). The diluents employed are those in which the monomer is soluble but in which the polymer is essentially insoluble.

The polymerization of these monomers by the anionic dispersion technique also results in the formation of a unique dispersion of the "living polymer."

2 Claims, No Drawings

ANIONIC DISPERSION POLYMERIZATION OF STYRENE MONOMERS

This invention relates to anionic dispersion polymerization of styrene monomers and is particularly related to the anionic dispersion polymerization of α-methylstyrene in order to produce high molecular weight poly(α-methylstyrene) having high heat distortion characteristics and high glass transition temperature (Tg). In one of its specific aspects, the present invention is directed to a novel composition comprising dispersion of poly(α-methylstyrene) produced by the anionic dispersion polymerization of α-methylstyrene.

Low molecular weight poly(α-methylstyrene), namely, polymers with reduced viscosities of the order of 0.05 to 0.1, have been readily obtained by free radical or cationic polymerization of α-methylstyrene. These polymers have found widespread applications as plasticizers and in coating and varnish compositions. The corresponding high molecular weight polymer, however, has been difficult to prepare, at least on an industrial scale and in relatively good yields.

Polymerization of α-methylstyrene by the well-known free radical technique fails to produce a high molecular weight polymer. Similarly, polymerization of this monomer by the so-called cationic polymerization method results only in the production of the low molecular weight polymer except at extremely low polymerization temperatures of the order of about −80°C. or even lower.

High molecular weight poly(α-methylstyrene, namely, polymers having reduced viscosities of the order of about 0.4 and higher (molecular weight of the order of 100,000 or more) have been prepared by anionic bulk or solution polymerization of α-methylstyrene. However, such polymerization in bulk has several inherent disadvantages and limitations. The polymerization is normally conducted at room temperature and the system generally becomes solid and unmanageable unless the degree of conversion of the monomer to the polymer is relatively low. The resulting polymerizate is difficult to handle and transport unless the solid polymer mass is broken down into smaller, more readily transportable particles. Furthermore, due to the equilibrium nature of the monomer-polymer system, a high monomer concentration is necessary for the formation of a high molecular weight polymer and a high degree of conversion. However such high concentrations of the monomer result in the formation of a viscous polymer solution which also is difficult to handle and transport.

It has now been discovered that high molecular weight poly(α-methylstyrene) can be produced by anionic dispersion polymerization of α-methylstyrene without the disadvantages and limitations which have heretofore been encountered in the bulk or solution polymerization of this monomer. In addition to their high molecular weight, the resulting polymers exhibit high heat distortion characteristics and high glass transition temperatures (Tg).

It has further been discovered that polymerization of α-methylstyrene by anionic dispersion technique results in the formation of a novel dispersion system containing "living polymer" of α-methylstyrene with unique properties as will hereinafter be described. The term "living polymer" is familiar to those skilled in the art and refers to a polymer whose propagating species will react by adding another monomer unit and in the absence of such a monomer will remain active (alive) and stable indefinitely.

In its broadest aspect, the process of this invention comprises dissolving α-methylstyrene and a dispersing agent in a diluent which dissolves the monomer and the dispersing agent but in which the resulting polymer is essentially insoluble. The mixture may be heated to facilitate the dissolution of the dispersing agent in the diluent. Thereafter an anionic type initiator is added to the resulting solution thus forming an active species, i.e., either an anion or the dianion which are relatively stable and will not polymerize unless and until a promoter is added. Once the promoter is added, the polymerization proceeds rapidly and exothermically. It is essential that the initiated mixture be cooled to a temperature below the so-called "ceiling temperature" (i.e., the temperature above which no further polymer is former) and polymerization continued at such temperatures until terminated by the addition of a compound which arrests further propagation and polymerization. The resulting polymer can then be recovered by filtration, centrifugation or any other suitable method.

In carrying out the polymerization process of this invention, it is essential that the polymerization temperature be maintained below the ceiling temperature of the polymer being produced. This temperature is different depending upon the particular starting monomer. For example, the ceiling temperature for poly(α-methylstyrene) is about 60°C. Thus the polymerization temperature can vary from about −40° C. to about the ceiling temperature of the polymer, preferably from about −15°C. to about 25°C. It has been found that the rate of propagation of the polymer in this temperature range is more favorable than the rate of depropagation. Above the ceiling temperature, the rate of depropagation is greater than the rate of propagation. Therefore, the polymerization of α-methylstyrene is adversely affected when the temperature during the propagation step exceeds the ceiling temperature.

The polymerization process of the invention is normally carried out at atmospheric pressure or at subatmospheric pressure. Superatmospheric pressures may also be employed but there is no particular advantage in conducting this polymerization process at pressures in excess of about 1 atmosphere.

The residence time of this polymerization process can vary from about several seconds to about several hours, preferably from about 30 seconds to about 3 hours, with the most optimum residence time being determineable in each case by those skilled in the art depending upon the ultimate desired molecular weight and yield of the polymer.

As was previously indicated, the diluent employed must be a solvent for the monomer and the dispersing agent and a non-solvent for the polymer produced during the polymerization process. Preferred diluents encompass saturated aliphatic hydrocarbons containing four to about 20 carbon atoms, preferably those containing five to about 12 carbon atoms; and saturated aliphatic ethers conforming to the general formula

R'OR'' where R' and R'' is each independently an alkyl radical containing one to about 10 carbon atoms. Examples of suitable aliphatic hydrocarbons which can be employed as diluents in the process of this invention include the butanes, pentanes, hexanes, heptanes, octanes, nonanes, decanes, undecanes, dodecanes and the like, or mixtures thereof. For example, light petroleum naphthas and gasoline fractions can be effectively employed for such purpose.

Exemplary saturated aliphatic ether diluents include dimethyl ether, diethyl ether, diisopropyl ether, methyl ethyl ether, methyl isopropyl ether and the like, or mixtures of such ethers.

In all cases, the polymerization conditions (both before and after propagation) must be so selected that the diluent remains essentially in the liquid phase throughout the process of this invention.

The polymerization process of this invention must be carried out under an inert atmosphere such as argon, nitrogen and the like. Accordingly, the polymerization vessel is initially purged with an inert gaseous material to assume that the polymerization reaction is carried out under an inert environment.

The monomers which are polymerizable by the process of this invention can generally be represented by the following structural formula:

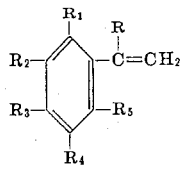

in which R is a hydrogen or a lower alkyl radical containing one to five carbon atoms and $R_1$, $R_2$, $R_3$, $R_4$ and $R_5$ each is independently a hydrogen atom or a lower alkyl radical containing one to five carbon atoms. Exemplary monomers include styrene, α-methylstyrene, α-ethylstyrene, α,p-dimethylstyrene (also known as 4-isopropenyl toluene) αtrimethylstyrene, p-isopropyl-α-methylstyrene and the like.

The amount of monomer employed depends largely upon the choice of the diluent and is normally dictated by the solubility of the polymer in the monomer under the prevailing polymerization conditions. When using hydrocarbon diluents, it is normally advantageous to employ a monomer-to-diluent ratio of from about 1:20 to about 4:1, preferably between about 1:10 to about 2:1. For ether diluents this ratio can likewise be varied between about 1:20 to about 4:1, preferably from about 1:10 to about 2:1. Higher monomer concentrations will result in dissolving the resulting polymer and thus preventing the formation of the dispersed phase. It is therefore important that the monomer concentration be maintained below the limits at which the polymer begins to dissolve in the monomer-diluent mixture.

The dispersing agents (sometimes called interfacial agents) which are uniquely suited to maintain the resulting polymers in a dispersed phase are poly(vinyl alkyl ethers) conforming to the general formula:

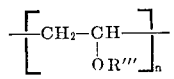

in which R''' is an alkyl radical containing one to about 20 carbon atoms, preferably two to about six carbon atoms and n is an integer ranging from about 100 to about 1,000,000, and most preferably from about 100,000 to about 500,000. Such dispersing agents include poly(vinyl methyl ether), poly(vinyl ethyl ether), poly(vinyl isopropyl ether), poly(vinyl isobutyl ether), or the like. Mixtures of these dispersing agents may be employed, if desired.

Other dispersing agents which can also be employed though with somewhat less degree of efficacy include polybutadiene, the chlorinated isobutylene-isoprene copolymers, the high molecular weight poly(olefin oxides) such as poly(ethylene oxide) and high molecular weight poly(propylene oxide).

The concentration of the dispersing agent is critical. If this concentration is too low, no dispersion will be formed. On the other hand excess amounts of the dispersing agent will interfere with the formation of an adequate and stable dispersion. Generally, the concentration of the dispersing agent will vary depending largely upon the monomer, the diluent, and the monomer-to-diluent ratio and can therefore vary from about 0.1 to about 5 percent by weight, preferably from about 0.3 to about 3 percent by weight based on the monomer employed.

The compounds which are used to initiate the polymerization of the monomers herein are generally familiar to those skilled in the art. Such initiators include an alkali metal such as sodium (usually used in form of a dispersion) or alkyl lithium compounds such as butyl lithium. As was previously mentioned, the initiator must be dissolved in the monomer-diluent solution and therefore the monomer-diluent-initiator mixture may sometime, such as when sodium initiator is employed, be heated to dissolve both the monomer and the initiator in the diluent and thereafter cooled, if necessary before the promoter is added so that the temperature does not exceed the ceiling temperature of the polymer during the propagation step.

Many well known compounds can be employed to promote the polymerization reaction of this invention. These include tetrahydrofuran, polypropylene glycol ethers, poly(ethylene oxide) and the like. Preferred compounds which are particularly effective promoters in the process of this invention are phosphoramides which may be defined generically by the formula

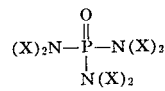

in which X is an alkyl radical containing one to six carbon atoms. Hexamethylphosphoramide has been found to be a particularly useful and effective promoter in this process.

Termination of the polymerization may be effected by the addition of any one of the terminators known to those skilled in the art. These include water, $CO_2$, alcohols (such as methanol or ethanol), epoxides (such as ethylene oxide), acids (such as acetic acid), etc. It is readily apparent that if water or alcohol is used to terminate the polymerization, the resulting terminal group on the polymer will be hydrogen, if $CO_2$ is employed the resulting terminal group will be carboxy acids and if ethylene oxide is used, it will be an alcohol.

Once the polymerization reaction is terminated, the resulting polymer can be recovered by any one of the various methods known in the art, such as filtration, centrifugation and the like, followed by drying the resulting wet polymer. The dispersion system produced by the process of this invention generally contains a solid content (polymer) ranging from about 5 to about 60 weight percent preferably between about 20 to about 45 weight percent of the total dispersion. Dispersion systems containing solid contents in excess of about 60 weight percent can be produced but tend to be somewhat viscous and therefore manageable with some difficulty.

The process of this invention will now be further illustrated by the following examples.

EXAMPLE 1

100 milliliters of α-methylstyrene (specific gravity of 0.906), 100 ml. of heptane and 1 gram of poly(vinyl ethyl ether) were charged to a 1-liter laboratory flask, equipped with a mechanical stirrer, thermometer, gas inlet, reflux condenser and serum-stoppered injection port. The mixture was heated to 90°C. on a steam bath under an argon atmosphere which was introduced through the gas inlet to provide an inert atmosphere. The mixture was heated until the dispersing agent was completely dissolved in heptane. Thereafter 0.05 ml. of dispersion of sodium in toluene was introduced into the solution through the serum stopper and the mixture continued to be heated for about 15 minutes until the sodium was completely dissolved. The sodium dispersion which was added consisted of 40 percent by weight sodium metal in xylene having an average particle size of 5 microns. The resulting mixture was then externally cooled to 0°C. with a mixture of ice and alcohol. One ml. of hexamethylphosphoramide was then added to the solution in the flask resulting in the formation of a dispersed polymer phase within less than 1 minute and also causing the temperature of the mixture to rise to 27°C. The dispersion was then cooled to approximately 0°C. with agitation and the temperature was maintained at this lever for approximately 30 minutes. Polymerization was then terminated by bubbling carbon dioxide through the mixture for approximately 5 minutes. The mixture was thereafter diluted with methanol and filtered, washed with additional amounts of methanol and finally dried under vacuum at 50° to 60°C.

Approximately 71.6 grams of poly(α-methylstyrene) was recovered having a reduced specific viscosity (RV) of 0.63 dl/gm. The yield obtained in this example was 71.6 percent. The RV is determined as follows:

$$RV = \eta_{sp}/C$$

where C is the concentration of the polymer in grams/100 ml. of solvent and $\eta_{sp}$ is the specific viscosity of the polymer solution and is equal to $(\eta - \eta_0)/\eta_0$ in which $\eta$ and $\eta_0$ are the solution and solvent viscosities, respectively.

EXAMPLE 2

In this and the subsequent examples, the equipment and procedure for the polymerization were essentially the same as in example 1.

Approximately 1.5 grams of poly(vinyl ethyl ether) and 250 ml. of α-methylstyrene were dissolved in 300 ml. of heptane and the solution cooled to 020 C. Thereafter a 0.25 ml. solution of butyl lithium in heptane (containing 22 percent by weight butyl lithium) was added to initiate the polymerization followed by the addition of 0.5 ml. hexamethylphosphoramide which caused the temperature of the mixture to increase to 25°C. The polymerization was conducted under agitation and at about 0°C. by external cooling of the reaction flask. The polymerization was terminated after 1 hour by bubbling carbon dioxide through the resulting dispersion and the polymer was recovered by filtration, washing with ethanol and drying as in example 1.

Approximately 170 grams of poly(α-methylstyrene) was recovered (76 percent yield) having a reduced viscosity of 1.1 dl/gm.

Approximately 0.5 gram of poly(vinyl ethyl ether) and 250 ml. of α-methylstyrene were dissolved in 300 ml. of heptane at 25°C. and then cooled to 0°C. Thereafter 5 ml. solution of sodium initiator (prepared by dissolving 1 gram sodium metal in a solution of 5.5 grams of naphthalene in 100 ml. of ethylene glycol dimethyl ether, titrated at 1.1 normal of sodium solution) was added to the resulting solution followed by the addition of 0.5 ml. of hexamethylphosphoramide. The polymerization was terminated after 30 minutes by bubbling $CO_2$ through the dispersion and the polymer was recovered as in the previous examples.

Approximately 150 grams of polymer was recovered (67 percent yield) having an RV of 0.87 dl/gm.

EXAMPLE 4

Approximately 1.5 grams of poly(vinyl ethyl ether) and 250 ml. of α-methylstyrene and 0.5 ml. of sodium dispersion (containing 10 millimoles of sodium in toluene) were dissolved in 300 ml. hexane at 50°C. and then cooled to 0°C. Thereafter, polymerization was started by the addition of 2.5 ml. of promoter (hexamethylphosphoramide). The polymerization was continued for 1 hour after which it was terminated by bubbling $CO_2$ through the polymerization system. The resulting dispersion was then dried in air to evaporate the hexane and the residue dried.

Approximately 153 grams of polymer was recovered (68 percent 250 having an RV of 2.1.

EXAMPLE 5

The monomer in this example was α,p-dimethylstyrene (also called 4-isopropenyl toluene).

Approximately 25 ml of the monomer and 0.23 gram of poly(vinyl ethyl ether) were dissolved in 25 ml. of heptane containing 0.05 ml. sodium dispersion at 90°C. The solution was then cooled to 0°C. and 0.2 ml. of hexamethylphosphoramide was added to promote the polymerization. The temperature of the resulting mixture rose slightly after addition of the promoter but was maintained at 0°C. by external cooling. The polymerization was carried our for 1 hour at 0°C. after which it was terminated by the addition of ethanol. The resulting dispersion was then filtered and dried to recover the polymer, i.e., poly(α-p-dimethylstyrene).

14.4 Grams of polymer was recovered (61 percent yield) having an RV of 0.47

EXAMPLE 6

Approximately 19 ml. of α-methylstyrene and 0.2 grams of poly(vinyl ethyl ether) were dissolved in 30 ml. of diethyl ether and the solution was cooled to −10° C. Thereafter 0.3 ml. of 6.8 normal solution of butyl lithium in hexane was added followed by the addition of 0.6 ml. of hexamethylphosphoramide. The polymerization was conducted at this temperature (−10°C.) for a period of 8 minutes and was terminated by isopropanol.

14 grams of poly(α-methylstyrene was recovered corresponding to a yield of 81.0 percent.

EXAMPLE 7

The monomer in this example was α,m, p-trimethylstyrene.

30 Ml. of the monomer and 0.7 gram of poly(vinyl ethyl ether) were dissolved in 75 ml. of hexane at 25°C. and the resulting solution cooled to −10°C. thereafter 0.5 ml. of a 7 normal solution of butyl lithium was added followed by the addition of 0.1 ml of hexamethylphosphoramide. The polymerization reaction was continued at −10°C. for 15 minutes after which it was terminated by the addition of isopropanol. The polymer, i.e., poly(α, m, p-trimethylstyrene) was recovered from the resulting dispersion by filtration and drying as in the foregoing examples.

Approximately 22.15 grams of polymer was recovered (82.5 percent yield) having a reduced viscosity of 0.51.

EXAMPLE 8

The monomer in this example was p-isopropyl-α-methylstyrene.

30 Ml. of the monomer, 0.2 gram of poly(vinyl ethyl ether) and 0.1 ml. of hexamethylphosphoramide were dissolved in 75 ml. of hexane at 25°C. and the resulting solution was then cooled to 0°C. Thereafter 0.2 ml. of a 7 normal solution of butyl lithium was added and the mixture polymerized at 0°C. for 15 minutes after which the polymerization reaction was terminated by the addition of methanol to the resulting dispersion. The polymer, i.e., poly(p-isopropyl-α-methylstyrene) was then recovered by filtration and drying as in the foregoing examples.

Approximately 13.4 gram of polymer was recovered (49 percent yield) having an RV of 0.95.

EXAMPLE 9

This example illustrates the anionic dispersion polymerization of styrene.

10 ml. of styrene, 0.1 gram of poly(vinyl ethyl ether) and 0.05 ml of hexamethylphosphoramide were dissolved in 50 ml. of hexane at room temperature (25°C.). The resulting solution was then cooled to −40° C. and 0.05 ml. of a 7 normal solution of butyl lithium was added thereto and the mixture polymerized at −40° C. for 1 minute. The polymerization reaction was terminated by the addition of isopropanol and the resulting dispersion and the resulting polymer, i.e., polystyrene, was recovered as in the foregoing examples.

Approximately 10 grams of polystyrene was recovered having a reduced viscosity of 0.51. It is thus noted that the yield in this example was approximately 100 percent.

EXAMPLE 10

This example illustrates the use of tetrahydrofuran as the promoter for the polymerization of α-methylstyrene by the process of this invention.

Approximately 0.2 gram of poly(vinyl ethyl ether) and 19 ml. of α-methylstyrene were dissolved in 30 ml. of heptane at 25°C. and the resulting solution cooled to −10°C. Thereafter 0.3 ml. of a 7 normal solution of butyl lithium and 5 ml. of tetrahydrofuran were added to this resulting solution and the mixture polymerized at −10°C. for 8 minutes. Isopropanol was then added to the resulting dispersion to terminate the polymerization and the resulting poly(α-methylstyrene) was recovered as in the previous examples.

Approximately 11.2 grams of the polymer was recovered corresponding to a yield of 65.5 percent.

As was previously stated in addition to its high molecular weight, the poly(α-methylstyrene) produced by the process of this invention has high heat distortion characteristics and high glass transition temperature of about 180°C. They can be injection molded or extruded into various plastic articles and they can be employed as a matrix in fiber reinforced compositions.

The resulting dispersion of terminated poly(α-methylstyrene) may be blended with other non-aqueous dispersions for uses in a variety of coating applications. The dispersion containing the living polymer may be reacted with a non-aqueous dispersion of a reactive polymer (i.e., a polymer containing reactive groups) such as polyvinyl acetate or polyacrylate to produce a grafted copolymer suitable for various coating applications, or, after isolation of the polymer, used for injection molding or extrusion into various plastic articles. Furthermore, such dispersion of the living polymer can be employed to react with glass fibers treated with a coupling agent, such as silicon tetrachloride. Thus, the fiber glass may first be treated with silicon tetrachloride and thereafter mixed with a dispersion of living polymer of α-methylstyrene. The silicon tetrachloride reacts with the water on the glass surface and also with living polymer in the dispersion thus forming a chemical bond and imparting improved adhesion to the glass surface.

What is claimed is:

1. A process for the production of a dispersion system containing a high molecular weight living polymer of alpha-methyl styrene comprising effecting the anionic dispersion polymerization of alpha-methyl styrene at a temperature below about 60°C. in the presence of (a) a diluent, in which the alpha-methyl styrene is soluble but in which the polymer thereof is essentially insoluble, said diluent being selected from the group consisting of saturated aliphatic ethers represented by the formula R'OR" wherein R'R and R" are alkyl radicals having one to 10 carbon atoms and saturated aliphatic hydrocarbons having four to 20 carbon atoms; (b) a dispersing agent consisting essentially of a poly(vinyl alkyl ether) represented by the formula:

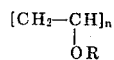

in which R is an alkyl radical having two to six carbon atoms and $n$ is an integer from 100 to 1,000,000; (c) an initiator containing an alkali metal; and (d) a promoter having the following structural formula:

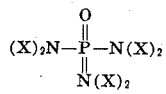

wherein X is an alkyl radical having one to six carbon atoms, wherein the amount of dispersing agent is about 0.1 to about 5 percent by weight of the alpha-methyl styrene, the ratio of alpha-methyl styrene to diluent is between about 1 to 20 and about 4 to 1 parts by volume, and the process is conducted in an inert atmosphere, the amount of each component of the dispersion system being selected to provide a dispersion system wherein the amount of living polymer is in the range of about 5 to about 60 percent by weight of the dispersion system.

2. The process of claim 1 comprising the following additional step:

terminating the living polymer.

* * * * *

PO-1050
(5/69)

UNITED STATES PATENT OFFICE
CERTIFICATE OF CORRECTION

Patent No. 3,684,761    Dated August 15, 1972

Inventor(s)    G. B. Stampa

It is certified that error appears in the above-identified patent and that said Letters Patent are hereby corrected as shown below:

Claim 1, line 10, change R'R to R'; lines 16 and 17 revise structural formula to read as follows

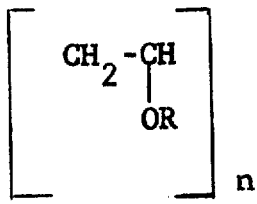

lines 22 to 24, revise structural formula to read as follows:

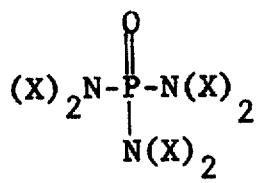

Signed and sealed this 9th day of January 1973.

(SEAL)
Attest:

EDWARD M. FLETCHER, JR.
Attesting Officer

ROBERT GOTTSCHALK
Commissioner of Patents